United States Patent [19]

Sakakibara et al.

[11] Patent Number: 4,660,692
[45] Date of Patent: Apr. 28, 1987

[54] CENTRIFUGAL AND TORQUE RESPONSIVE CLUTCH

[75] Inventors: Shiro Sakakibara; Shigeo Tsuzuki, both of Anjo, Japan

[73] Assignee: Aisin-Warner Limited, Anjo, Japan

[21] Appl. No.: 711,148

[22] Filed: Mar. 13, 1985

[30] Foreign Application Priority Data

Apr. 27, 1984 [JP] Japan ................................. 59-87047

[51] Int. Cl.$^4$ ............................................. F16D 43/22
[52] U.S. Cl. ............................... 192/3.31; 192/104 B; 192/105 CD; 192/106.1
[58] Field of Search ........ 192/3.31, 105 CD, 105 CE, 192/103 B, 105 CP, 104 B, 106.1

[56] References Cited

U.S. PATENT DOCUMENTS

| | | | |
|---|---|---|---|
| 2,065,040 | 12/1936 | Baule | 192/105 CE |
| 2,324,703 | 7/1943 | Hoffman | 192/105 CE |
| 3,224,541 | 12/1965 | Yamamoto | 192/105 CD |
| 4,117,918 | 10/1978 | Silbershlag | 192/103 B |
| 4,124,106 | 11/1978 | Clauss | 192/103 B |
| 4,138,003 | 2/1979 | Malloy | 192/106.1 |
| 4,140,208 | 2/1979 | Clauss et al. | 192/3.31 |
| 4,140,210 | 2/1979 | Schulz | 192/103 B |
| 4,157,136 | 6/1979 | Salle | 192/3.31 |
| 4,383,596 | 5/1983 | Jäckel | 192/105 B |
| 4,556,136 | 12/1985 | Lech, Jr. | 192/106.1 |

Primary Examiner—Leslie Braun
Assistant Examiner—Martin Belisario
Attorney, Agent, or Firm—Pahl, Lorusso & Loud

[57] ABSTRACT

A coupling mechanism including a fluid coupling device having input and output elements, and a centrifugal type lock-up clutch for releasably engaging the input and output elements, characterized in that the lock-up clutch comprises: a cylindrical inner surface formed on the input element; a drive plate provided with friction elements displaceable in a radially outward direction for engagement with the cylindrical inner surface, and cam weights for urging the friction elements in a radially outward direction; a driven plate coupled with the output element; a damper of a resilient material provided between the drive and driven plates; and a cam surface for urging the cam weights in a radially outward direction according to the degree of relative displacement between the drive and driven plates.

7 Claims, 15 Drawing Figures

CENTRIFUGAL AND TORQUE RESPONSIVE CLUTCH

BACKGROUND OF THE INVENTION (i) Field of the Invention

This invention relates to a coupling mechanism particularly suitable for use as a starter, employing a centrifugal lock-up clutch which permits a broad freedom in setting variations of torque capacity for power transmission, in combination with a fluid coupling device such as torque converter, fluid coupling or the like.

(ii) Description of The Prior Art

In transmissions of motor vehicles, it has been known to use a direct coupling clutch (or a lock-up clutch) in a coupling mechanism employing a fluid coupling, for the purpose of enhancing the efficiency of power transmission. The lock-up clutches are generally classified into a piston type and a centrifugal type, of which the piston type has drawbacks in that it incurs a higher cost and needs a complicate control mechanism. With a view to eliminating these drawbacks, the present inventors previously proposed in Japanese Patent Application No. 58-205299 a starter which employs centrifugally rotatable cam weights for a centrifugal clutch, thereby permitting a large increase of clutch torque capacity in a low speed range and improving durability of the lock-up clutch. However, the torque capacity of the centrifugal clutch of our previous proposal depends on the rotational speed of the turbine runner, so that there arises a problem that the durability of the lock-up clutch is deteriorated in a high-load low-speed operation, for example, in a long hill-climbing operation on steep slopes due to the heat which is generated by slipping of the lock-up clutch. Besides, the torque capacity depends on the rotational speed of the turbine runner alone, so that it is necessary to use heavier friction shoes and cam weights in order to secure large torque capacity (for application to a high power engine), and to sacrifice compactness in order to ensure strength of component parts.

SUMMARY OF THE INVENTION

It is an object of the present invention to adjust the torque capacity of a lock-up clutch which is mounted on an input member of a damper through both of the rotational speed of a turbine and the transmitting torque of the lock-up clutch. The adjustment of torque capacity according the rotational speed of the turbine relies on the centrifugal force acting on friction shoes and cam weights as mentioned hereinbefore, while the adjustment according to the transmitting torque relies on the torque being transmitted by the lock-up clutch and the angle of resulting torsional deformation of input and output members of the damper. More particularly, the torque which is transmitted by the lock-up clutch is reflected by the torsional angle (the relative rotational angle) of the input and output members of the damper. Accordingly, when seen from the side of the damper input member on which the lock-up clutch is mounted, the damper output member (or the damper driven plate) is twisted relative to the former in a direction opposite to the engine. This torsional angle is converted into strokes of cam surfaces or twists of torsion springs and applied to rotate the cam weights, adjusting the torque capacity of the lock-up clutch in response to the transmitting torque.

According to the present invention, there is provided a coupling mechanism including a fluid coupling device having input and output elements, and a centrifugal type lock-up clutch for releasably engaging the input and output elements of the fluid coupling, characterized in that the lock-up clutch comprises: a cylindrical inner surface formed on the input element; a drive plate provided with friction elements displaceable in a radially outward direction for engagement with the cylindrical inner surface, and cam weights for urging the friction elements in a radially outward direction; a driven plate coupled with the output element; a damper of a resilient material provided between the drive and driven plates; and a biasing means for urging the cam weights in a radially outward direction according to the degree of relative displacement between the drive and driven plates.

The coupling mechanism with the above-described construction according to the invention has the following advantages.

(a) Since the torque capacity is self-controlled by the rotational speed of the turbine and also by transmitting torque, it becomes possible to secure suitable clutch capacities under various operating conditions of a vehicle.

(b) Accordingly, the durability of the clutch is improved and power losses in transmission is reduced, in addition to improvements in mileage and power quality.

(c) The damper is twisted during coasting operations in a direction opposite to the direction in engine drive operations, so that the cam surfaces move away from the cam weights to cancel the influence of the transmitting torque on the torque capacity. Consequently, the torque capacity during coasting operations is reduced by the trailing effect, preventing the shocks which would otherwise occur when the engine torque changes from positive to negative.

(d) The torque capacity can be adjusted by varying the shape of cam surfaces formed on the damper driven plate and the spring constant of torsion springs, without entailing increases in size of the clutch which has a compact construction as a whole.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings

DESCRIPTION OF PREFERRED EMBODIMENTS

Figure 1:
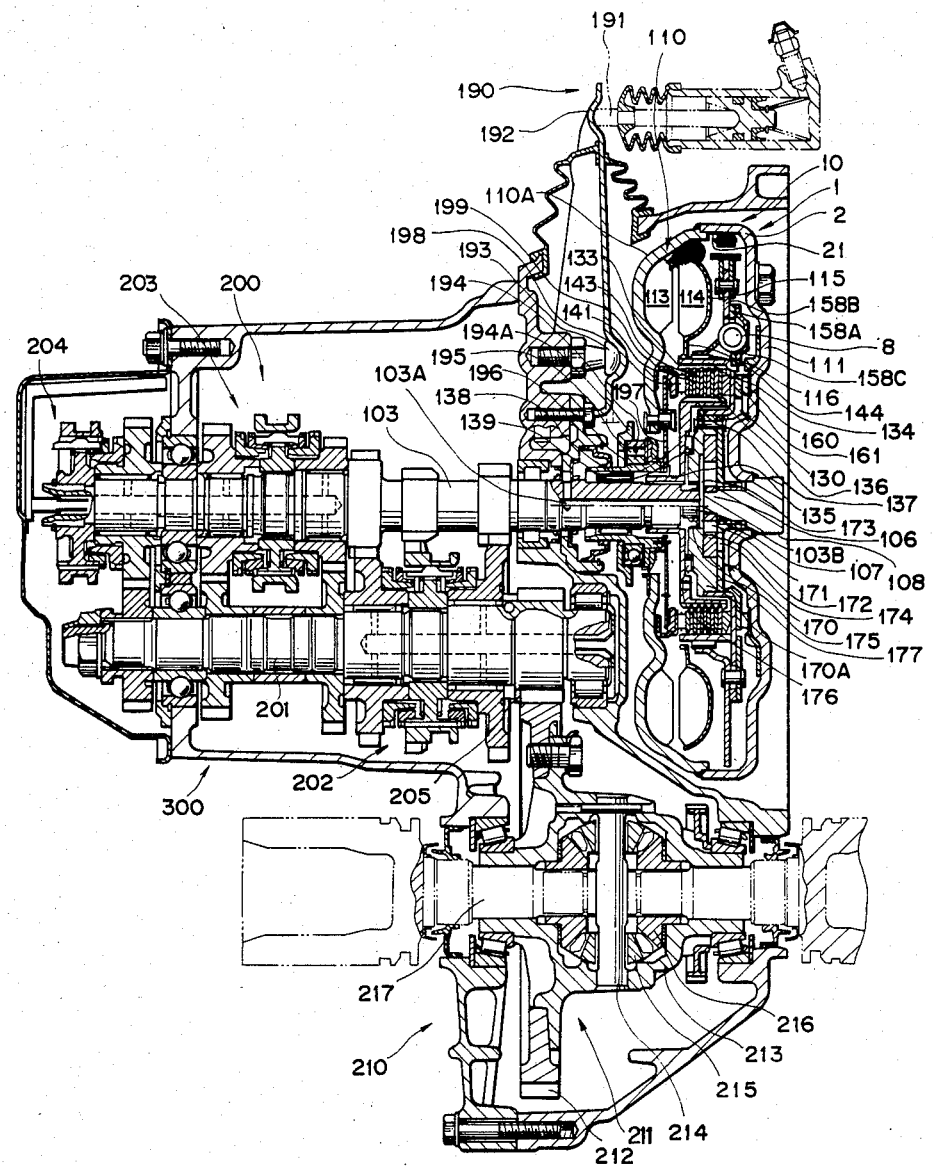
FIGS. 1 and 2 are schematic sectional views of a fluid coupling incorporating a coupling mechanism embodying the present invention.

Hereafter, the coupling mechanism according to the present invention is described more particularly by way of preferred embodiments shown in the drawings.

Referring to FIGS. 1 to 6, there is illustrated a vehicular transmission including a coupling mechanism 1, a speed change gear mechanism 200 with five forward and one reverse gear positions, a differential mechanism 210, and a transmission case 300 housing the foregoing mechanisms.

The coupling mechanism 1 includes: a fluid coupling 110 (hereinafter referred to simply as "coupling" for brevity); a power cut-off clutch 130 (hereinafter referred to simply as "clutch" for brevity) mounted on the inner side of the fluid coupling; a lock-up clutch 10 provided in an outer peripheral portion of the coupling 110 on the side of the engine in the particular embodiment shown (on the right side and the term "right side" has the same meaning in the following description); an oil pump 170 provided between input and output members of the coupling 110; and a servo mechanism for engaging and releasing the clutch 130.

The coupling 110 includes: a front cover 111 coupled with an input shaft of the coupling mechanism, which is connected to the engine crank shaft through elements not shown; an annular plate-like rear cover 110A welded at its outer periphery to the front cover 111; pump blades 113 provided on and around the inner wall surface of a rear cover 110A; turbine blades 114 provided opposingly to the pump blades 113; and a turbine runner 115 retaining the turbine blades 114. Passed centrally through the front cover 111 is a center shaft 108 forming a drive shaft 106 for the oil pump 170 at its fore end on the side of the transmission gear mechanism 200 (on the left side and the term "left side" has the same meaning in the following description), and a disk plate retaining shaft 107 in its middle portion for supporting the oil pump cover 117 which is secured to the oil pump 170, slidably in both axial and rotational directions. Further, the front cover 111 is provided with a frictional coupling surface 21 on the inner side of its outer peripheral wall, which forms the inner peripheral surface of an axially extending drum portion 2.

The clutch 130 includes: a clutch drum 134 with an inner spline 133 formed on its inner periphery thereof, the clutch drum 134 having a hub portion 116 of the turbine runner 115 welded to its left end in the drawing and fixedly receiving therein a guide sleeve 144 for slidably centering a damper drive plate 158B which serves as an output member of the lock-up clutch 10; a damper driven plate 158A secured at its inner periphery to the oil pump body 170A, provided with and retaining dampers 8 of resilient material on its outer peripheral side, supporting the pressure of a diaphragm spring 197 at its center portion on the left side in the drawing while transmitting the pressure of the diaphragm spring 197 on the right side, abutted against a bearing race 161 of a thrust bearing 160 mounted on the front cover 111 for rotation therewith, and having the clutch drum 134 securely fixed thereto in a perpendicularly intersecting relation; a front damper plate 158C securely fixed to the damper driven plate 158A and a damper drive plate 158B with friction coupling elements on the outer periphery thereof; a hub portion 135 splined to the output shaft 103 of the coupling mechanism 1; a clutch disk wheel 139 including a clutch hub portion 137 with an outer spline formed on its outer periphery in a position opposing with the inner spline 133 of the clutch drum 134, and a disk portion 138 directly connecting the hub portion 135 and clutch hub portion 137; a plural number of clutch plates 141 having the outer peripheries thereof splined to the clutch drum 134; and clutch disks 143 having the inner peripheries thereof splined to the clutch hub portion 137 of the clutch disk wheel 139 and overlapped alternately with the clutch plates 141.

Figure 4:
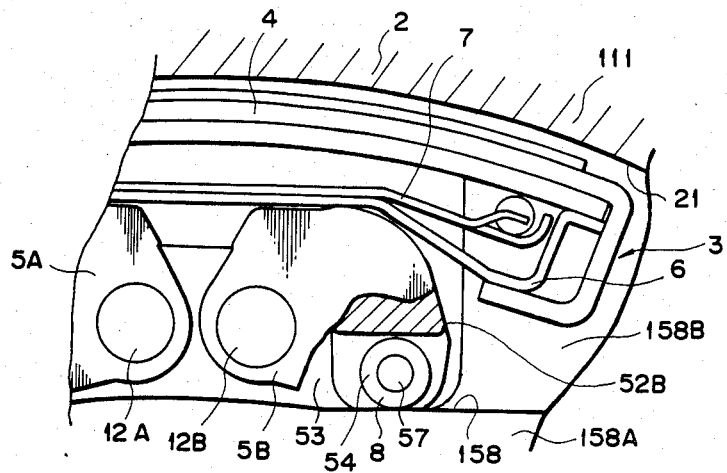

As illustrated particularly in FIG. 4, the lock-up clutch 10 is constituted by a frictional coupling surface 21 engaging surface 21 formed on the front cover 111 serving as an input member of the coupling; a damper drive plate 158B provided with friction elements 3 which are displaceable radially outward according to the centrifugal force and the transmitting torque for engagement with the frictional coupling surface 21, and cam weights 5A and 5B for urging the friction elements radially outward; a damper driven plate 158A coupled with the output member of the coupling 110; dampers 8 of a resilient material provided between the damper drive and damper driven plates 158A and 158B; and cam surfaces 158 formed on the damper driven plate 158A for urging the cam weights 5A and 5B radially outward according to relative displacement between the damper drive and damper driven plates 158B and 158A.

Figure 2:
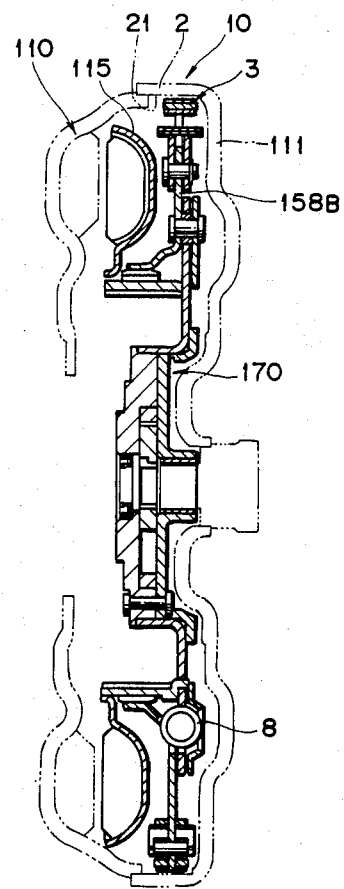

As shown in FIG. 2, the damper drive plate 158B is located between the front cover 111 and turbine runner 115, and in the form of an annular plate which is formed with notches 13 (FIG. 3) at uniform intervals around its outer periphery for mounting the friction elements 3. Further, a plural number of paired projections 11A and 11B which serve as support means are provided at uniform intervals on side walls of large radial extensions 11 of the drive plate 158B, and a plural number of paired support shafts 12A and 12B which also serve as second support means are provided at uniform intervals on side walls of small radial extensions 12 of the drive plate 158B. A friction element 3 which is supported on each pair of projections 11A and 11B is displaced radially outward according to the rotational speed and transmitting torque for engagement with the frictional coupling surface 21 on the drum portion 21 of the front cover 111. The plural number of paired projections 11A and 11B as well as the plural number of paird support shafts 12A and 12B are anchored in position in and across the damper drive plate 158B, and the friction elements 3 are hooked on the projections at the opposite ends thereof.

The frictional coupling elements 3 are each constituted by a friction shoe 4, cam weights 5A and 5B, a load spring 6, and a retractor spring 7.

Figure 3:
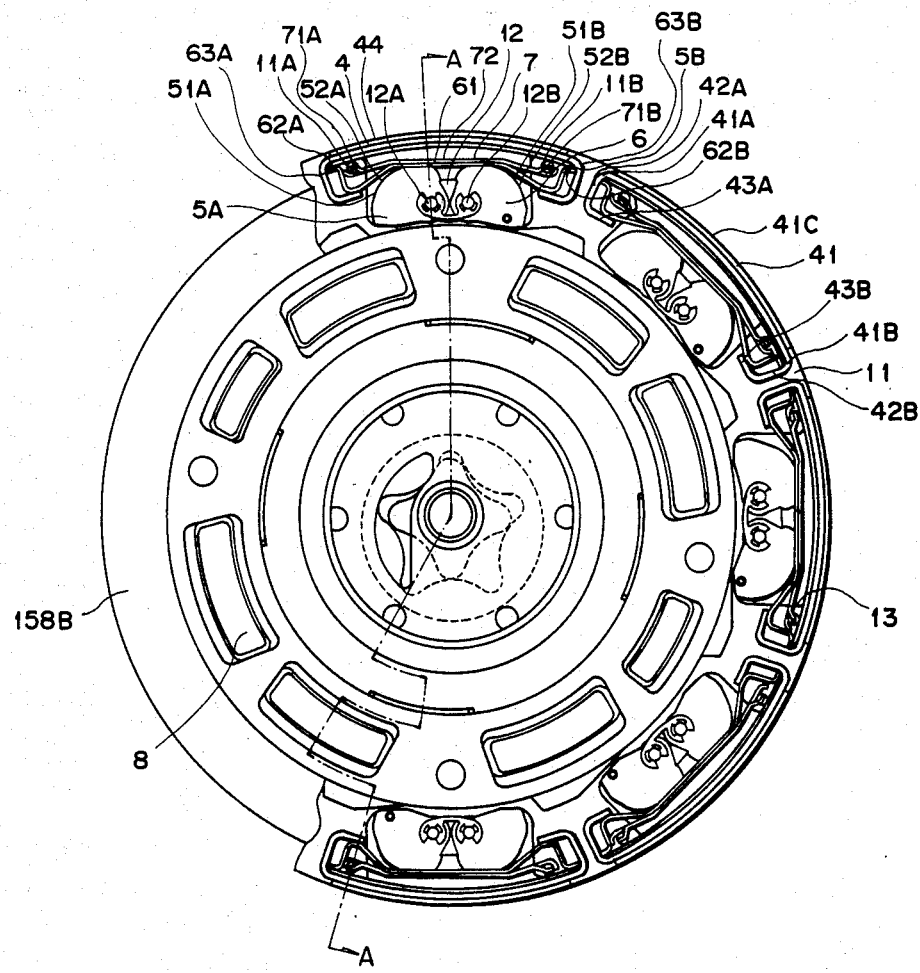
FIGS. 3 to 6 are a shcematic front view and fragmentary views employed for the explanation of the operations of the coupling mechanism according to the invention.

As shown particularly in FIG. 3, the friction shoe 4 is mounted in the circumferential directions of the corresponding paired projections 11A and 11B, and constituted by an arcuate portion 41 with a frictional coupling surface 41C on the outer periphery thereof, stopper portions 42A and 42B extended radially inward from the opposite end portions 41A and 41B of the arcuate portion 41, and inwardly folded end portions 43A and 43B bent inward from the radially inner ends of the stopper portions 42A and 42B, respectively.

As seen in FIG. 3, a friction facing 44 is provided on the outer periphery of the arcuate portion 41, which frictional coupling surface 41C is engageable with the opposing frictional coupling surface 21 on the drum portion 2 of the front cover 111 during engine drive operations.

Figure 5:
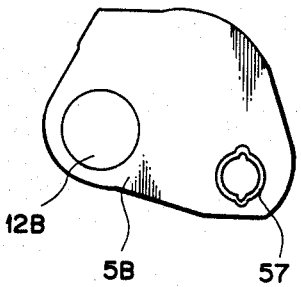
Figure 6:
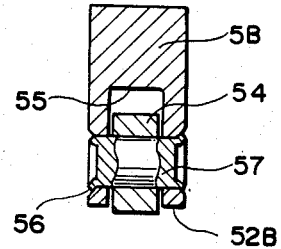

The cam weights 5A and 5B are stopped on the support shafts 12A and 12B of the damper drive plate 158B on the inner peripheral side thereof, and rotatably supported thereon on the radially inner side of the friction shoe 4 and paired projections 11A and 11B. The cam weights 5A and 5B are provided with cam surfaces 52A and 52B on their circumferential surfaces 51A and 51B, and have the respective centers of gravity in offset positions relative to the rotational axes thereof. Further, as shown in FIGS. 4 to 6, the cam weight 5B is provided with a cam follower roller 54 which is rotatably supported on the cam weight 5B in rolling contact with the cam surface 158 on the inner peripheral side 53 for reducing friction between the cam surface 158 of the damper driven plate 158A and the cam weight 5B and for preventing frictional wear of these parts. The cam follower 54 is supported on a shaft 57 which is fitted in a groove 55 of the cam weight 5B and retained in position by caulking as indicated at 56.

The load spring 6 is interposed between the cam weights 5A and 5B and the friction shoe 4 to urge them away from each other, and has its center portion 61 abutted against a plural number of cam weights 5A and 5B. At the opposite end portions 62A and 62B, the load spring 6 is provided with contact portions 63A and 63B in engagement with the stopper portions 42A and 42B of the friction shoe 4.

The retractor spring 7 is stopped on the paired projections 11A and 11B at its opposite end portions 71A and 71B as shown, and has its center portion 72 abutted against the center portion 61 of the load spring 6.

In the particular embodiment shown, the angle of torsion which occurs to the damper driven plate 158A relative to the damper drive plate 158B according to the transmitting torque of the lock-up clutch 10 is converted into displacement of the cam surface 158 formed on the damper driven plate 158A thereby directly pushing up the cam weight 5B of the lock-up clutch 10 as illustrated in FIG. 4. As a result, the load spring 6 is flexed by the cam weight 5B to press the friction shoe 4 against the frictional coupling surface 21. Thus, the torque capacity of the lock-up clutch 10 is determined by the centrifugal force resulting from rotation of the turbine runner 115 and the force with which the cam surface 158 pushes the cam weight 5B radially outward.

In this particular embodiment, the oil pump 170 consists of an inscribing gear pump, which is located within the clutch disk wheel 139 in a position between the oil pump cover 177 and the disk portion 138 of the clutch disk wheel 139. This oil pump includes: a casing 170A which is secured at its outer periphery to the oil pump cover 177, loosely fitted at its inner periphery on the small diameter portion 103B at the fore end of the output shaft 103 of the coupling mechanism through an oil seal 175, and abutted against the disk portion 138 of the clutch disk wheel 139 through a thrust bearing 176; an outer gear 172 rotatably fitted in a gear room provided in the casing 170A on the side of the engine; an inner gear 171 splined on the fore end of the center shaft 108; a suction port 173 communicating with the oil passage 103A formed centrally through the output shaft 103; and a discharge port 174 communicating with a space between the oil pump cover 177 and front cover 111.

The servo mechanism 190 of the clutch 130 includes: a connecting rod 191 linked to a servo mechanism operated by the clutch pedal besides the driver's seat or by the intake manifold vacuum or automatic charge and discharge of a fluid pressure or the like; a pressure rod 192 turnable about a fulcrum point 193 by the connecting rod 191; a bearing case 194 having a flange 194A in abutting engagement with the fore end of the pressure rod 192; a bearing 195 fitted in the bearing case; a sliding sleeve 196 fitted in the bearing 195; a diaphragm spring 197 having the inner peripheral edge thereof abutted against the right end of the sliding sleeve 196; and a pressure ring 199 engaged with the outer peripheral edge of the diaphragm spring 197 to press the clutch 130 through the thrust bearing spring 198. The clutch 130 is released and slided (half-coupling) automatically or by a driver's effort.

The transmission gear mechanism 200 is of a known construction and utilizes the output shaft of the coupling mechanism as its input shaft, the transmission gear mechanism 200 further including: an output shaft 201 mounted parallel with the input shaft (103); a dog clutch 202 for shifts between first and second speeds; a dog clutch 203 for shifts between third and fourth speeds; and a reverse gear which is not shown.

Further, as shown in FIG. 1, an output gear 205 which is mounted on a drive portion of the output shaft 201 is meshed with a ring gear 212 of a differential gear assembly 211 of the differential mechanism 210, thereby transmitting the power of the output shaft 201 from the ring gear 212 to the side gear 216 through case 213, spider 214 and pinion 215 and to the drive wheels of the vehicle through an axle 217.

The coupling mechanism according to the invention operates in the manner as follows.

(1) Behaviors of cam weights

The cam weights 5A and 5B which are rotatably mounted on the support shafts 12A and 12B are rotated with the turbine runner 115 at the same rotational speed (r.p.m.), and, since the centers of gravity of the respective cam weights 5A and 5B are located off the center axes of the support shafts 12A and 12B, they are thrown radially outward by the centrifugal force, each generating a rotational moment about the support shaft 12A or 12B (hereinafter referred to as "centrifugal torque of the cam weight 5A and 5B").

This centrifugal torque of the cam weights 5A and 5B varies depending upon the rotational speed of the turbine runner 115, location of the center of gravity, effective radius of the cam weight 5A and 5B and so forth, and becomes smaller with a larger rotational angle of the cam weight 5A and 5B, reaching a 0 (zero) level when the rotational axes of the cam weights 5A and B (the axes of the support shaft 12A and 12B) are aligned with the center of gravity and the center of the turbine runner 115, as expressed by the following equation.

$$Tc = Fc \times rg \times \sin\alpha$$

wherein:
$Fc = w/g \times R \times (2\pi N/60)^2$;
$Tc$ = the centrifugal torque of the cam weights;
$Fc$ = the centrifugal force acting on the centers of gravity of the cam weights;

rg = the distance from the axis of the support shaft to the center of gravity of the cam weight;
g = the gravitational acceleration;
w = the weight of the cam weight;
N = the rotational speed of the turbine runner 5 (r.p.m.);
R = the distance from the center of the turbine runner to the centers of gravity of the cam weights; and
α = the angle of a straight line passing through the axis of the support shaft and the center of gravity of the cam weight relative to the acting direction of the centrifugal force (the angle being taken as positive if in the rotational direction of the cam weights 5A and 5B).

Following are observations on the forces which act on the contact areas of the cam surfaces 52A and 52B with the load spring 6.

When the cam weights 5A and 5B are turned by the aforementioned centrifugal torque, the force Fr (a force tending to push the load spring 6 radially outward) which occurs at the contact portions between the cam surfaces 52A and 52B and the load spring 6 varies depending upon the wedging effect which in turn varies according to the shape of curved cam surfaces 52A and 52B relative to the centers of rotation of the cam weights 5A and 5B. Therefore, by suitably shaping the cam surfaces 52A and 52B of the cam weights 5A and 5B, the pressure which is applied to the load spring 6 by the centrifugal torque can be varied finely in relation with the rotational speed of the turbine runner 115.

Namely, the force with which the cam weights 5A and 5B tend to push the friction shoe 4 outward varies depending upon the centrifugal torque and the wedging effect varying according to the rotation of the cam weights, and at the same time depend-upon the transmitting torque of the lock-up clutch 10. Namely, transmission of a certain torque by the lock-up clutch 10 causes a corresponding torsion between the input and output members of the damper, and as a result causes a relative displacement of the cam surface 158 formed on the damper driven plate 158A, turning the cam weight 5B about the support shaft 12B to push the friction shoe 4 radially outward.

Figure 7:
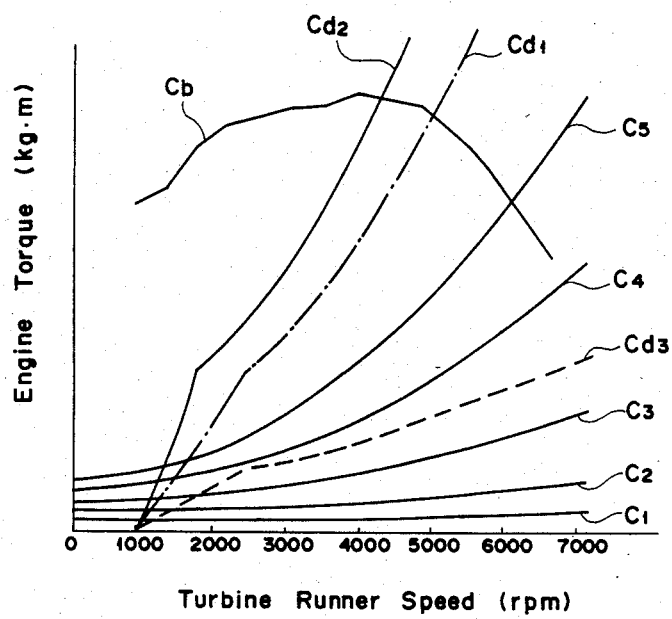
FIG. 7 is a diagram showing the clutch torque capacity of the first embodiment shown in FIGS. 1 and 2.

(2) FIG. 7 shows the clutch torque capacity which is determined by the pressure exerted on the friction shoe 4 by the cam weights 5A and 5B commensurate with the wedging effect and the centrifugal force acting on the friction shoe 4 and load spring 6 themselves, and at the same time determined by the pressure exerted on the friction shoe 4 according to the transmitting torque of the lockup clutch 10.

In this figure, the characteristics curve Cd1 represents the torque capacity of the lock-up clutch relying on the centrifugal force alone, Cd2 an example of the torque capacity of a lock up clutch controlled according to both the rotational speed of the turbine runner and the transmitting torque, C1 the road load in the first speed, C2 the road load in the second speed, C3 the road load in the third speed, C4 the road load in the fourth speed, C5 the road load in the fifth speed, and Cb the engine torque at the time of maximum engine drive.

(a) When the rotational speed of the turbine runner is in the range of 0–1000 r.p.m., the friction shoe 4 is pushed back in a radially inward direction by the reaction force of the retractor spring 7, without transmitting any torque.

(b) When the turbine runner is rotating at a speed of 1000–2000 r.p.m., the lock-up clutch torque capacity Cd1 is determined by both the centrifugal torque of the cam weights 5A and 5B and the centrifugal force on the friction shoe 4. If a certain torque is transmitted by the lock-up clutch 10 at this time, the cam weight 5B is further displaced according to the transmitting torque, increasing the lock-up clutch torque capacity to Cd2 which is greater than Cd1. The lock-up clutch torque capacities Cd1 and Cd2 exhibit upwardly convex characteristics which are attributable to the wedging effect of the cam weights 5A and 5B. Accordingly, in the rotational speed range of 1000–2000 r.p.m. in which the turbine runner is operated most frequently, it becomes possible to secure a lock-up clutch capacity Cd1 of a relatively large value. Although the load spring 6, friction shoe 4 and cam weights 5A and 5B are pushed back in radially inward directions by the reaction force of the retractor spring 7 when the rotational speed of the turbine runner is in the range of 0–1000 r.p.m., the centrifugal force acting on these components overcomes the reaction force of the retractor spring 7 as the rotational speed of the turbine runner is increased, bringing the friction shoe 4 into contact with the drum portion 2 to initiate torque transmission while holding the friction shoe 4 against the drum portion 2 in frictionally engaged state.

As the rotational speed is increased further, the centrifugal torque on the cam weights 5A and 5B becomes greater, and pushes the load spring 6 and retractor spring 7 gradually in a radially outward direction. Accordingly, the load spring 6 is pushed outward by the cam weights 5A and 5B at this time, pressing the friction shoe 4 against the drum portion 2 to increase the torque capacity of the clutch.

On further increases of the rotational speed, the cam weights 5A and 5B come into abutting engagement with each other and stop their operation since they are unable to rotate any further. In this state, the pressures of the cam weights 5A and 5B are charged in the load spring 6 as a reaction force.

(c) When the turbine runner is at a rotational speed of 2000–5000 r.p.m., the clutch torque capacity is determined by the reaction force of the load spring 6, which is charged in the rotational speed range of 1000–2000 r.p.m., and the centrifugal force acting on the friction shoe 4 itself, the lock-up clutch torque capacities Cd1 and Cd2 taking a form of a quadratic curve.

As the rotational speed of the turbine runner is further increased, the load spring 6 is displaced under the influence of the centrifugal force away from the cam weights 5A and 5B.

(3) Torque capacity in engine drive and coasting operations:

The torque is transmitted through different paths in the engine drive and coasting operations, lowering the lock-up torque capacity Cd3 in the coasting operation as compared with the torque capacities Cd1 and Cd2 in the engine drive operation by the leading and trailing effects for the purpose of suppressing uncomfortable shocks which would otherwise occur when the accelerator pedal is off.

In a starting operation, the torque transmission is initiated gradually from a turbine runner speed of about 1000 r.p.m., attaining a lock-up clutch torque capacity Cd1 capable of transmitting torque greater than the road load C3 at a speed higher than 1300 r.p.m.

This ensures a smooth start while preventing excessive slipping of the clutch. The clutch 130 is completely uncoupled during a shift operation, and, upon completion of a shift, it is smoothly coupled according to various operating conditions.

Although the coupling mechanism according to the invention is applied as a lock-up clutch of a fluid coupling in the foregoing embodiment, it may be similarly used as a lock-up clutch of a torque converter or the like, or other fluid type coupling devices.

Figure 8:
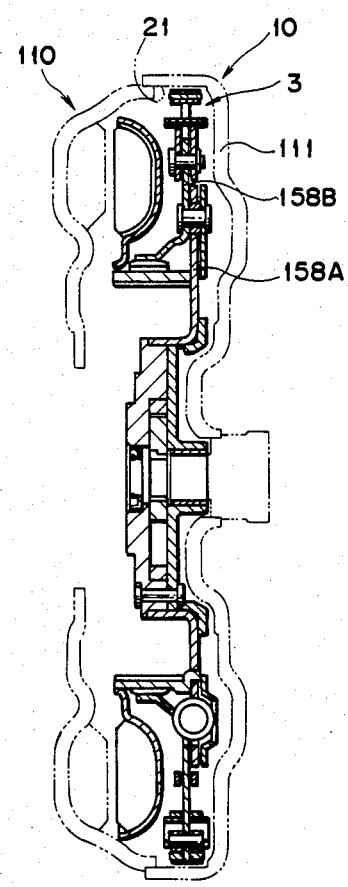
FIGS. 8 and 9 are a schematic section and a front view of a coupling mechanism constituting a second embodiment of the invention.
Figure 9:
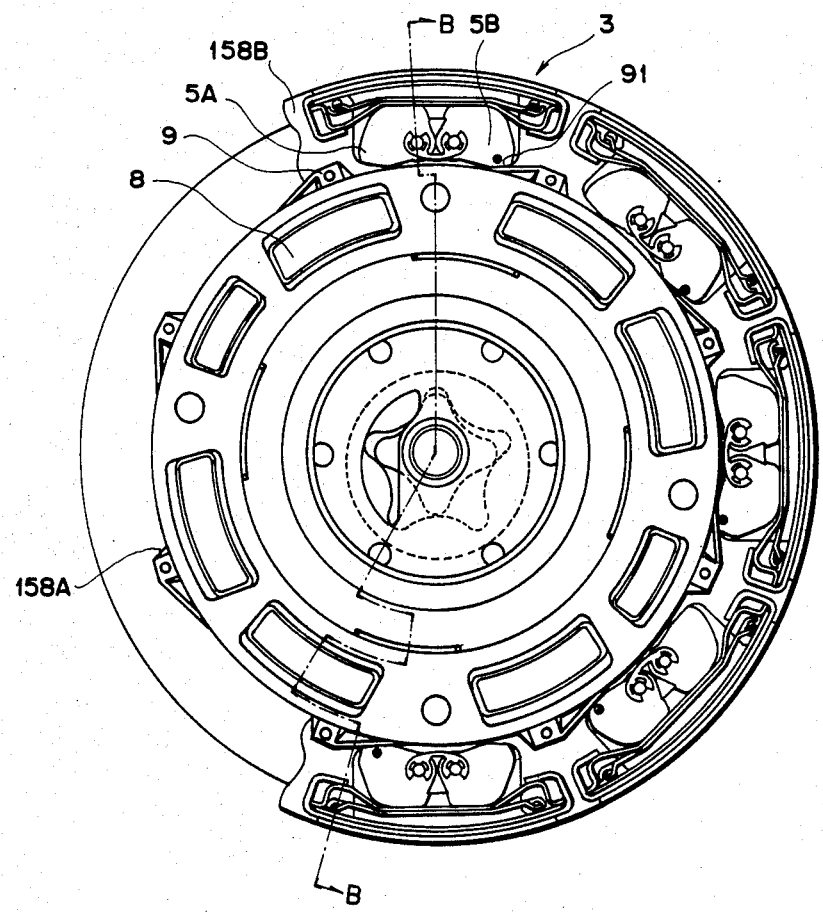
Figure 10:
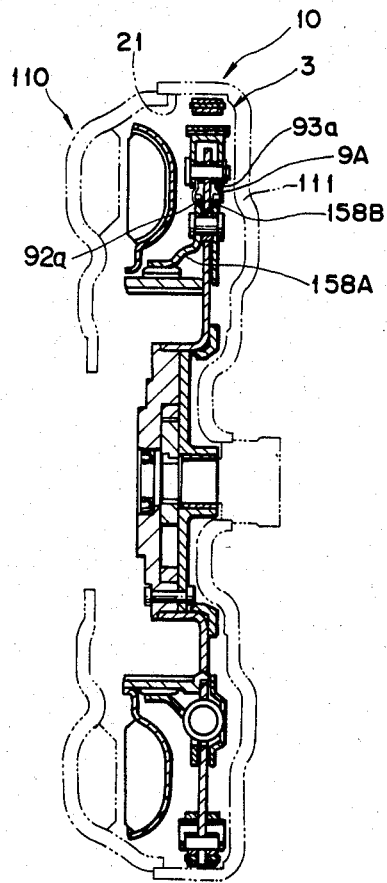
FIGS. 10 and 11 are a schematic section and a front view of a coupling mechanism constituting a third embodiment of the invention.
Figure 11:
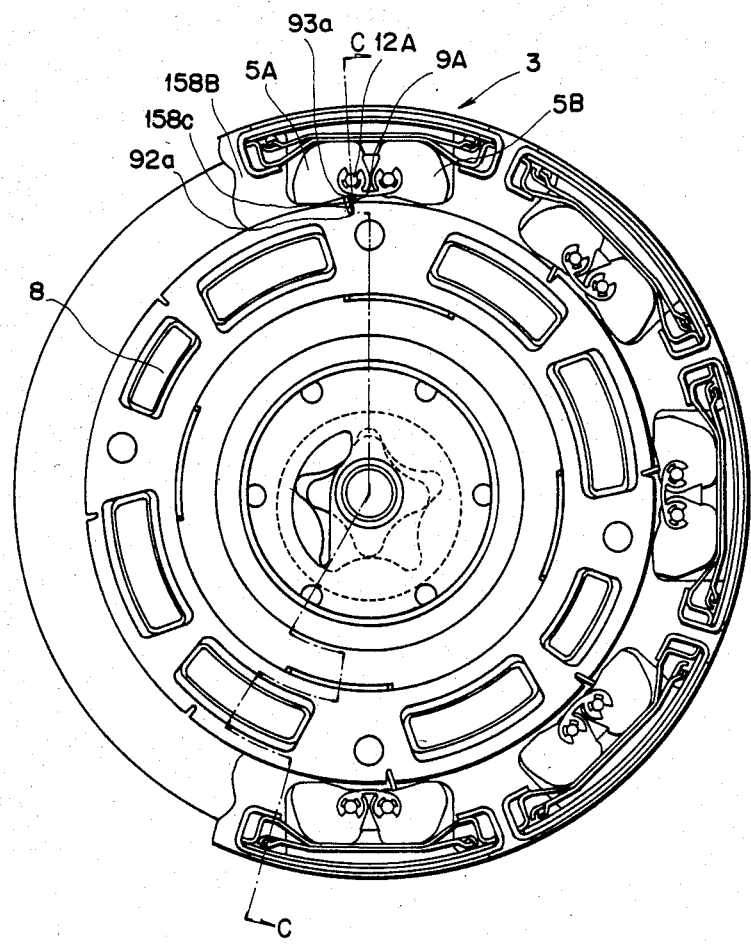

Illustrated in FIGS. 8 and 9 is a second embodiment of the invention, in which the lock-up clutch 10 includes: a frictional coupling surface 21 formed on the front cover 111 constituting an input member of the coupling 110; a damper drive plate 158B a friction element 3 displaceable radially outward under the influence of centrifugal force for engagement with the frictional coupling surface 21, and cam weights 5A and 5B for urging the friction element 3 radially outward; a damper driven plate 158A coupled with the output member of the coupling 110; a damper 8 of a resilient material interposed between the damper drive plate 158B and damper driven plate 158A; and a cam surface 91 formed on the damper driven plate 158A by a flexible member 9 for pushing the cam weight 5B in a radially outward direction in response to the degree of relative displacement between the damper drive plate 158B and damper driven plate 158A.

In this embodiment, the flexible member 9 which is used for the cam surface 91 on the damper driven plate 158A serves to prevent beating contact which might occur between the cam weight 5B and the cam surface 91 of the damper driven plate 158A due to vibration of the resilient damper 8 as caused by variations of the engine torque. Namely, the flexible member 9 prevents transmission of vibrations of the damper 8 to the cam weight 5B.

Illustrated in FIGS. 10 to 15 is a third embodiment of the coupling mechanism of the invention, in which the lock-up clutch 10 includes; a frictional coupling surface 21 formed on a front cover 111 constituting an input member of the coupling 110; a damper drive plate 158B provided with a friction element 3 displaceable radially outward under the influence of centrifugal force for engagement with the frictional coupling surface 21, and cam weights 5A and 5B for urging the friction element 3 in a radially outward direction; a damper driven plate 158A coupled with the output member of the coupling 110; a front damper plate 158C securely fixed to the damper driven plate 158A; a damper of a resilient material interposed between the damper drive plate 158B and damper driven plate 158A; grooves 158a and 158c formed in the damper driven plate 158A and front damper plate 158C; a torsion spring 9A having its opposite ends 92a and 94a stopped in the grooves 158a and 158c, a coil portion 93a wound around the support shaft 12A of the cam weight 5A, and a center portion 95a hooked on the cam weight 5A, the torsion spring 9A forming a biasing means in cooperation with the grooves 158a and 158c for urging the cam weight 5A radially outward when twisted.

Figure 12:
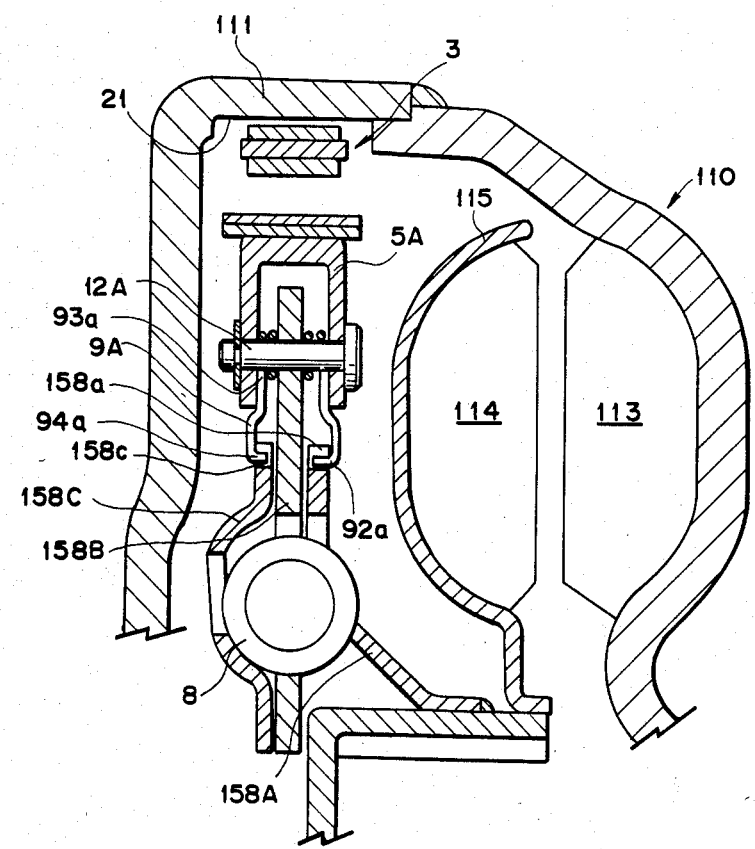
FIG. 12 is a fragmentary enlarged view of the coupling mechanism shown in FIG. 10.
Figure 14:
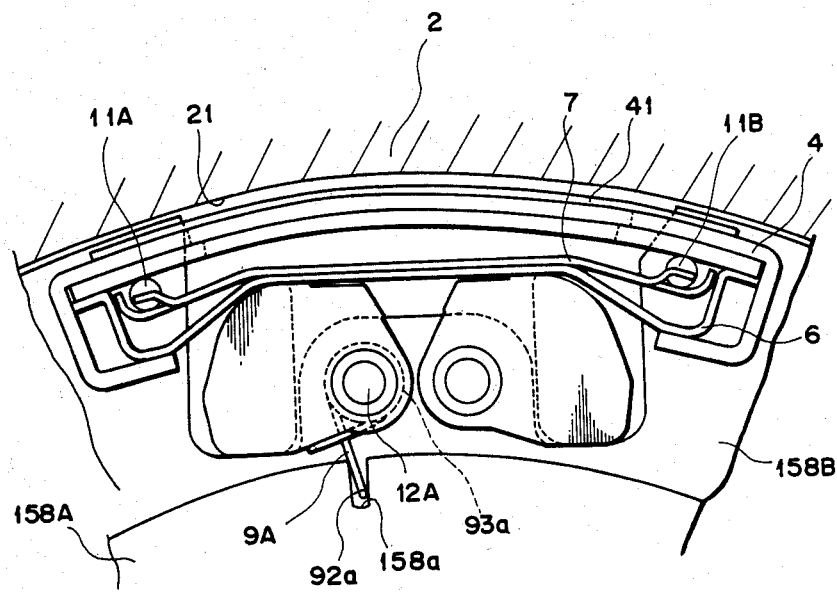
FIG. 14 is a fragmentary enlarged view of the coupling mechanism shown in FIG. 11.
Figures 13, 15:
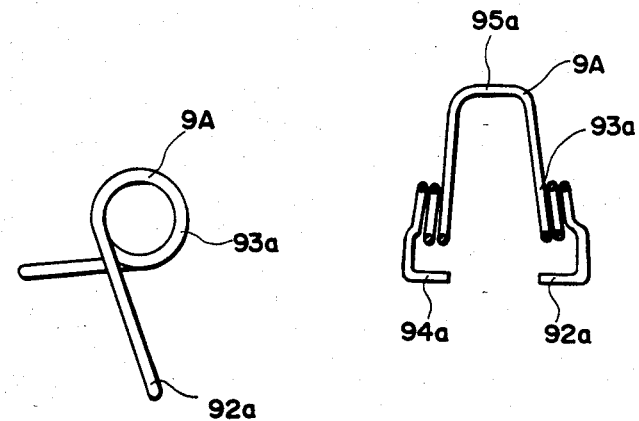
FIG. 13 is a schematic side view of a torsion spring employed in the third embodiment of the invention.
FIG. 15 is a schematic front view of a torsion spring employed in the third embodiment.

In this case, the turning moment of the cam weight 5A according to the transmitting torque is imparted by the twist of the torsion spring 9A. Namely, as illustrated in FIGS. 12 and 13, the end portions 92a and 94a of the torsion spring 9A are held in the grooves 158a and 158c formed in the damper driven plate 158A and the front damper plate 158C, respectively, and the coil portion 93a is fitted on the support shaft 12A of the cam weight 5A, so that the angle of torsion resulting from relative rotation between the damper drive plate 158B and damper driven plate 158A is converted into a twist of the torsion spring 9A to turn the cam weight 5A by an angle commensurate with the transmitting torque.

What is claimed is:

1. A coupling mechanism including a fluid coupling device with input and otuput elements, and a centrifugal type lock-up clutch for releasably engaging said input and output elements, chartacterized in that said lock-up clutch comprises:
    a cylindrical inner surface formed on said input element;
    a drive plate provided with friction elements displaceable in a radially outward direction for engagement with said cylindrical inner surface,
    said friction elements having:
        a friction shoe including an arcuate portion with a frictional engaging surface on the outer periphery thereof,
        a resilient retractor means located between said friction shoe and said drive plate to press said friction shoe in a radially inward direction,
        a pair of cam weights pivotally supported on said drive plate, including a curved cam surface, and
        resilient load means located between said curved cam surface and said friction shoe for pressing said friction shoe in a radially outward direction by the engagement of the curved cam surfaces with the resilient load means when said cam weights rotate,
    a driven plate coupled with said output element;
    a damper of a resilient material provided between said drive and driven plates; and
    a biasing means provided on said driven plate for urging said cam weights to press said friction shoe in a radially outward direction between said drive and driven plates.

2. A coupling mechanism as set forth in claim 1, wherein said biasing means comprises a cam surface formed on said driven plate to rotate said cam weights to press said friction shoe in a radially outward direction.

3. The coupling mechanism as set forth in claim 2, wherein said cam surface formed on said driven plate comprises a flexible member.

4. A coupling mechanism including a fluid coupling device with input and output elements, and a centrifugal type lock-up clutch for releasably engaging said input and output elements, characterized in that said lock-up clutch comprises:
    a cylindrical inner surface formed on said input element;
    a drive plate provided with friction elements displaceable in a radially outward direction for engagement with said cylindrical inner surface, and cam weights for urging said friction elements in a radially outward direction;
    a driven plate coupled with said output element;
    a damper of a resilient material provided between said drive plate and driven plates; and
    a biasing means for urging said cam weights in a radially outward direction between said drive plate and said driven plates, said biasing means comprising torsion springs provided between a groove formed in said driven plate and said driven plate.

5. The coupling mechanism of claim 2, wherein said cam weights are provided with rollers rotatably supported thereon for rolling contact with said cam surfaces.

6. The coupling mechanism of claim 3, wherein said cam weights are provided with rollers rotatably supported thereon for rolling contact with said cam surfaces.

7. A coupling mechanism as set forth in claim 1, wherein said biasing means includes a torsion spring having its end stopped in a groove formed in said driven plate, a coil portion wound around a support shaft of said cam weights formed on said drive plate, and a center portion hooked on the cam weight to rotate said cam weights to press said friction shoe in a radially outward direction when twisted.

* * * * *

UNITED STATES PATENT AND TRADEMARK OFFICE
CERTIFICATE OF CORRECTION

PATENT NO. : 4,660,692
DATED : April 28, 1987
INVENTOR(S) : Shiro SAKAKIBARA; Shigeo TSUZUKI It is certified that error appears in the above—identified patent and that said Letters Patent is hereby corrected as shown below:

Col 1, Line 21, "complicate" should --complicated--;

Col. 1, Line 47, delete "of"; and

Col. 1, Line 50, after "according" insert --to--.

Col. 2, Line 57, "shcematic" should read --schematic--.

Col. 4, Line 54, "paird" should --paired--.

Col. 7, Line 13, "sitive" should read "itive".

Col. 8, Line 24, after "in" insert --a--.

Col. 10, Line 6, "otuput" should read --output--.

Col. 10, Line 64, "driven" should read --drive--.

IN THE ABSTRACT:

Line 12, delete "cam surface" and insert --biasing means--.

Signed and Sealed this

Thirteenth Day of October, 1987

Attest:

DONALD J. QUIGG

Attesting Officer

Commissioner of Patents and Trademarks